United States Patent
Baum et al.

(10) Patent No.: US 6,808,223 B1
(45) Date of Patent: Oct. 26, 2004

(54) TWO WAY HINGE FOR MOTOR VEHICLE DOORS

(76) Inventors: Robert Baum, 1440 S. Carlos Ave., Ontario, CA (US) 91761; Paul Anderegg, 176 N. Palo Cedro, Diamond Bar, CA (US) 91765; Samir Rai, P.O. Box 643, Walnut, CA (US) 91788; Louis Connole, 4464 Sawgrass Ct., Chino Hills, CA (US) 91709

( * ) Notice: Subject to any disclaimer, the term of this patent is extended or adjusted under 35 U.S.C. 154(b) by 35 days.

(21) Appl. No.: 10/756,921

(22) Filed: Jan. 14, 2004

(51) Int. Cl.[7] ................................................. B60J 1/08
(52) U.S. Cl. .................... 296/146.12; 296/202; 49/246; 16/366
(58) Field of Search ....................... 296/146.11, 146.12, 296/202, 190.11; 49/236, 246, 248, 249; 16/366, 367, 368

(56) References Cited

U.S. PATENT DOCUMENTS

| | | |
|---|---|---|
| 3,589,069 A | 6/1971 | Lecomie |
| 4,684,167 A | 8/1987 | Newmayer |
| 4,719,665 A | 1/1988 | Bell |
| 4,801,172 A | 1/1989 | Townsend |
| 5,035,463 A | 7/1991 | Kato et al. |
| 6,000,747 A | 12/1999 | Sehgal et al. |
| 6,086,137 A | 7/2000 | Leschke et al. |
| 6,175,991 B1 | 1/2001 | Driesman et al. |
| 6,676,193 B1 * | 1/2004 | Hanagan ................ 296/146.11 |
| 2003/0213102 A1 | 11/2003 | Ham |

* cited by examiner

Primary Examiner—Joseph D. Pape
(74) Attorney, Agent, or Firm—Lewis M. Brande; Thomas A. McCleary; Brande and McCleary

(57) ABSTRACT

This invention describes a novel two way hinge for motor vehicle doors that hinges open at a 20 degree angle, then rotates upward 45 degrees. The motor vehicle door is maintained in the open position by a shock absorber/piston arrangement that is common in the automotive industry. The invention described herein can be installed by an aftermarket shop and/or sold as an easily installed kit. The present invention overcomes the shortcomings of existing hinges by allowing greater access for ingress and egress from existing motor vehicle doors in tight parking situations.

6 Claims, 8 Drawing Sheets

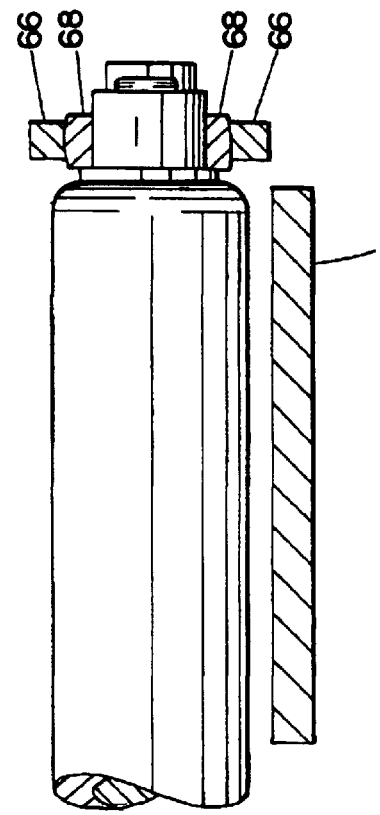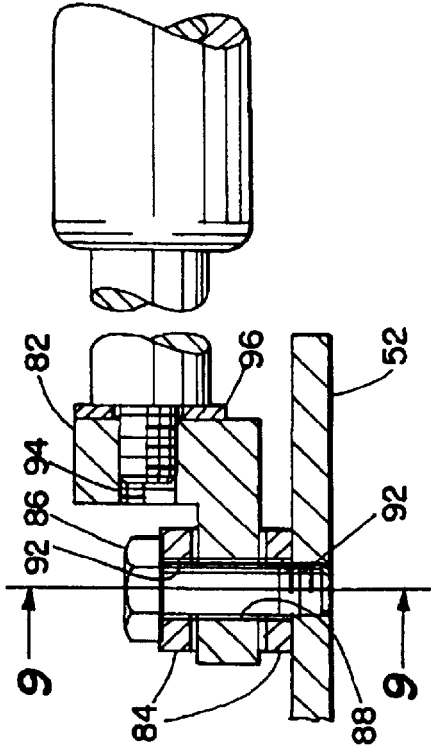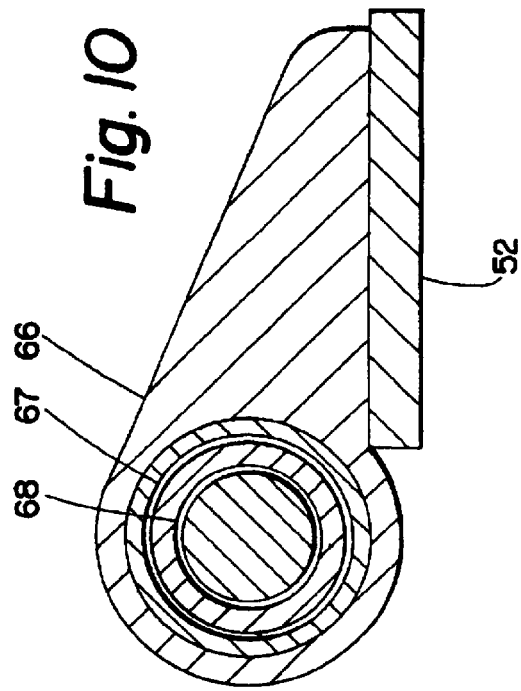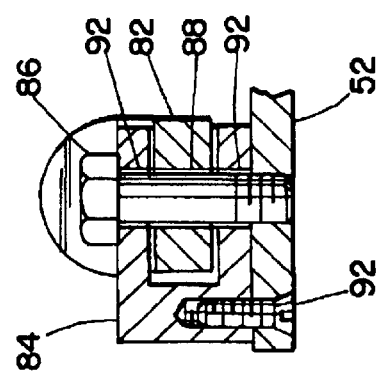

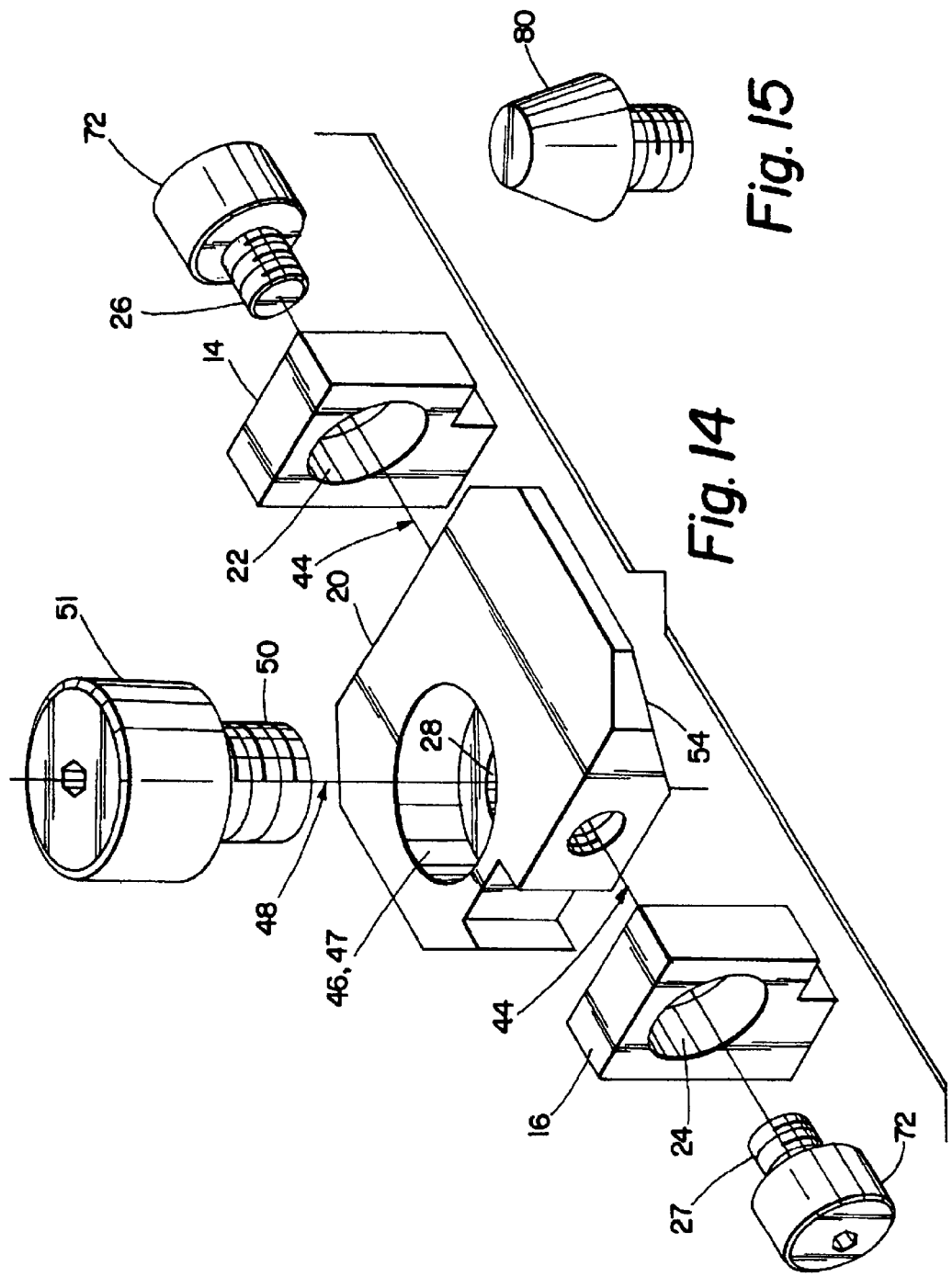

TWO WAY HINGE FOR MOTOR VEHICLE DOORS

BACKGROUND OF THE INVENTION

The present invention relates to novel hinge assembly for automobiles, trucks and the like, and more particularly to passenger and drivers doors that typically are hinged to only open outwards.

In order to ingress or egress from automobiles or other vehicles that have drivers and may carry passengers, the automotive manufactures have added doors. Generally the doors are mounted on a single hinge, where one half of the hinge is mounted onto the vertical door post of the body of the car, and the other half of the hinge is mounted onto a generally parallel door structure. This allows the hinge to open the door by swinging away from the vehicle, thereby providing an adequate amount of opening to exit the vehicle, since smaller vehicles have much smaller exit openings than the larger vehicles. Since automobiles and trucks are essentially rectangular in shape, the most common method of providing doors is to mount the hinge on a forward vertical edge of the door, allowing the trailing edge of the door to swing outwards and forward.

With the advent of more modern vehicles, the manufacturers have incorporated aerodynamic shapes in order top provide a more fuel efficient and a more aesthetically pleasing shape to the vehicle. Safety engineers have also had major input into the design of the doors, in order to provide the maximum amount of safety both pre and post collision. One of the most glaring negative aspects of having doors open along the vertical forward edge of the door is that a large amount of room is needed in order to swing the door open to it's greatest opening area.

There have been many efforts to revise the opening method of automobile doors not only for aesthetic purposes, but also for safety, in order to provide improved ingress and egress for passengers. In an effort to modernize the door assemblies to more effectively accommodate the complexity and sophistication of modern automotive and truck design, some manufacturers have incorporated non-standard door assemblies.

Mercedes, and BMW have incorporated the "Gull wing" designs into a limited number of their vehicle designs. Delorean has also incorporated a non-standard door assembly, by allowing the door to rotate along its top edge to provide an opening for the driver and passenger. The Lamborghini Countach has doors which pivot vertically about the top forward edge of the doors. These doors, however, were only used in show cars and a small number of limited production cars.

SUMMARY OF THE INVENTION

The present invention is a two way hinge, where one flange of the hinge is mounted onto a hard point on the fender walls of the vehicle. A second flange is mounted onto the vertical door sill. The second flange is rotatably and hingeably mounted to the first flange such that the door hinges open 45 degrees, and then rotates upwards 20 degrees. The door is maintained in an open position by a standard shock/piston arrangement. The piston also reduces the amount of force needed to open the door.

The present invention also overcomes some of the shortcomings of existing hinges by allowing greater access for ingress and egress from existing automobiles and trucks, particularly in tight parking spaces.

The present invention provides a much more pleasing aesthetic vehicle which mimics more expensive vehicles such as the Lamborghini, Mercedes and Delorean at a greatly reduced per vehicle cost.

The present invention may be installed by an aftermarket shop, or person, and be sold as an easily installed kit. Alternatively, it may be installed by the manufacturer as an alternative to the existing hinge methods.

DESCRIPTION OF THE PRIOR ART

U.S. Pat. No. 4,801,172 by Townsend, discloses a Vehicle closure. This patent is generally designed for vehicles that are aerodynamically designed, and therefore have highly curved shapes. The door assembly is slidably mounted onto the vehicle and is rotatably moveable within the curved exterior about a series of arcs, where the door slides underneath the vehicle.

U.S. Pat. No. 6,086,137 by Leschke et al. Discloses a "Side Door of a Passenger Vehicle". This invention is based upon a singular pivot hinge that is geometrically mounted on the body work, typically the front fender area. The pivot is normally a bearing and allows for quick release from the A pillar of a vehicle. The operation of the mechanism allows for a rotation away from the vehicle prior to the rotation upwards. The basic differences between the present invention and the Leschke patent are that the present invention is specifically designed for a variety of vehicles and would be installed as an after market arrangement by either the owner or a shop. The design of the Leschke patent is such that the vehicle manufacture must install the hinge mechanism and also must design the door and body structure to accommodate the hinge.

U.S. Pat. No. 3,589,069 by Lecomte discloses a "Vehicle Door Mounting". This invention allows a door to rotate about a single fixed pivot shaft. The design of the Lecomte patent design allows the door to rotate open, but also the door translates outward along the hinge axis during the rotational motion. This is a discrete type of singular motion, in that only during rotation is the door forced to translate away from the bodywork of the vehicle. A shortcoming this patent is that the hinge system can only be accommodated by specific body shapes, and can not be easily accommodated with a large variety of automobiles or trucks in the open market.

BRIEF DESCRIPTION OF THE DRAWINGS

FIG. one shows a front view of a motor car with the doors open.

FIG. two shows a rear view of a motor car with the doors open.

Figure 1:
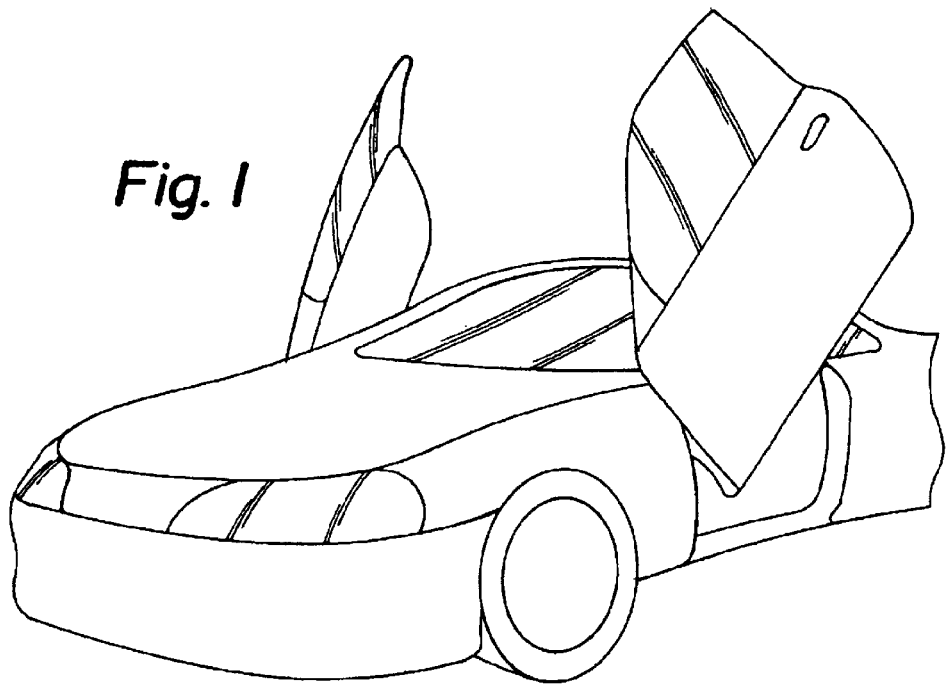
Figure 2:
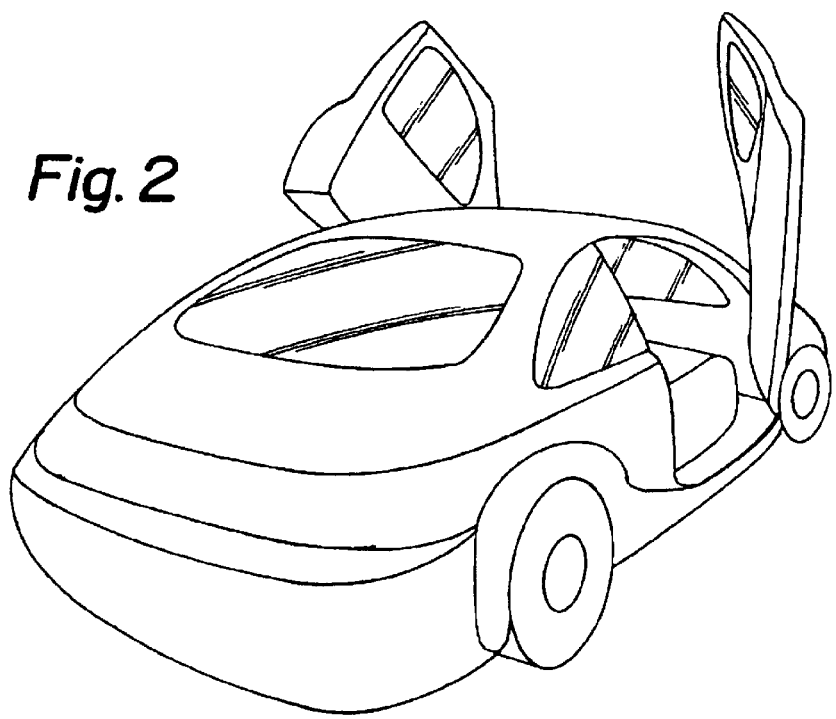
Figure 3:
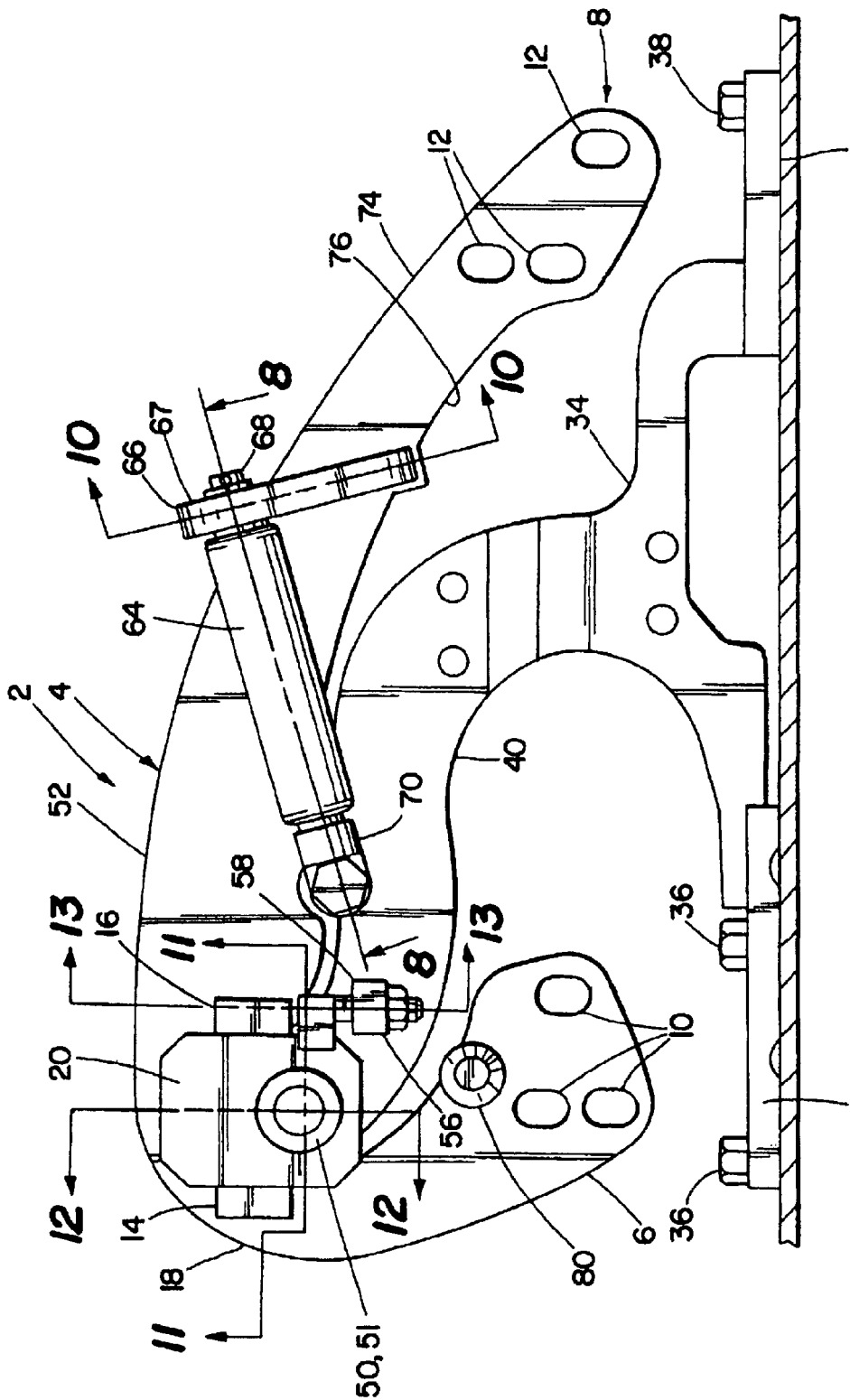
Figure 4:
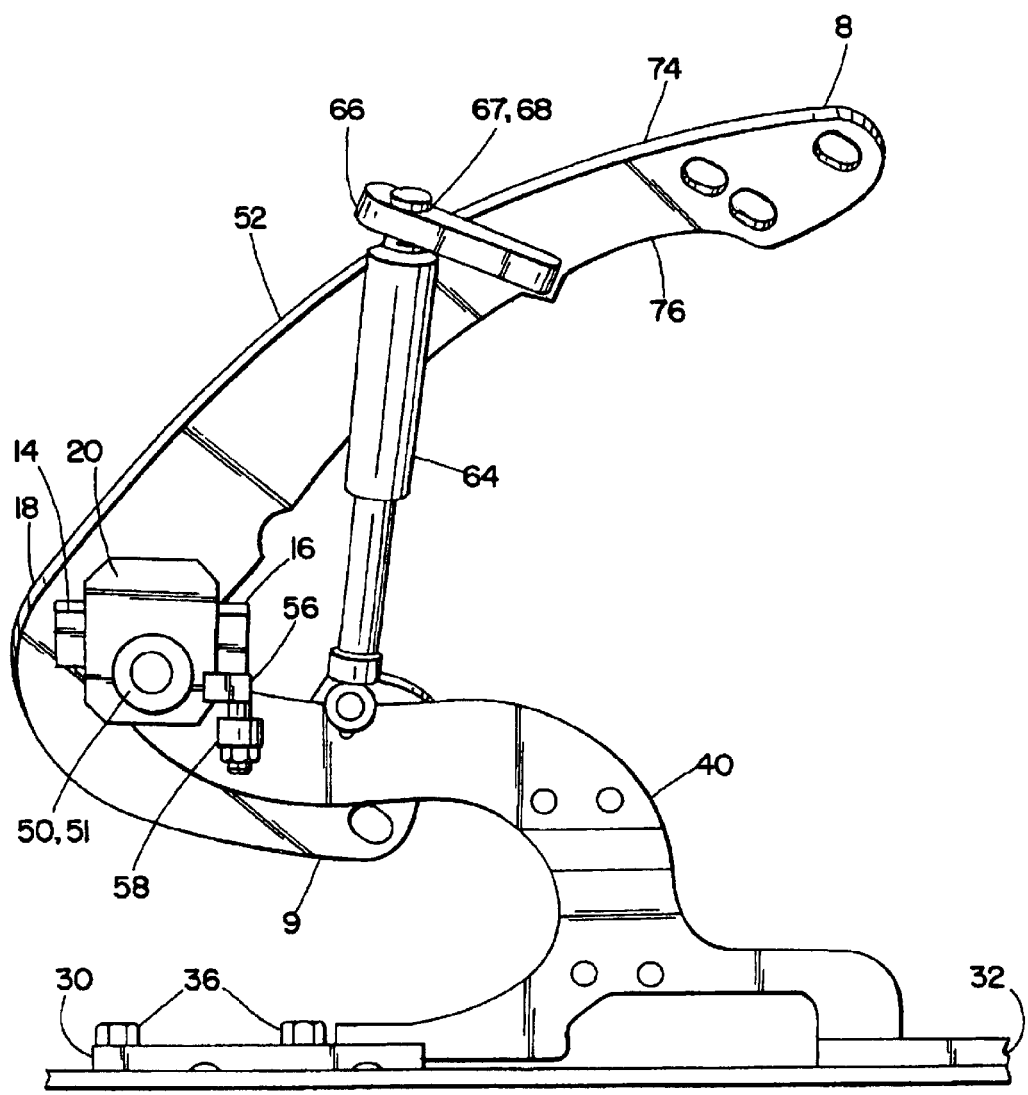
Figure 5:
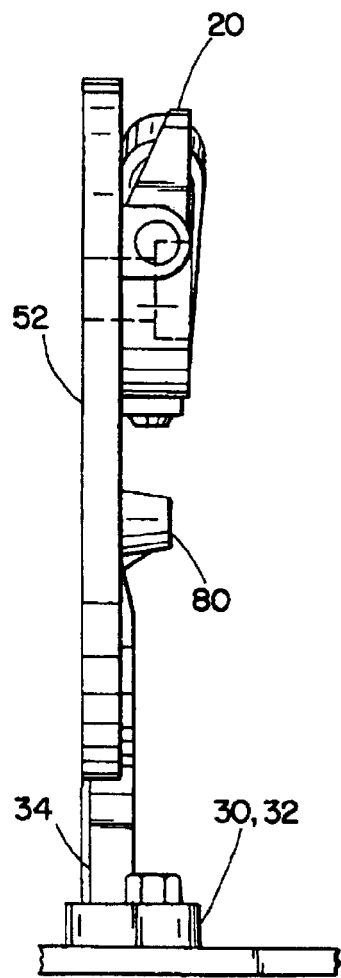
Figure 6:
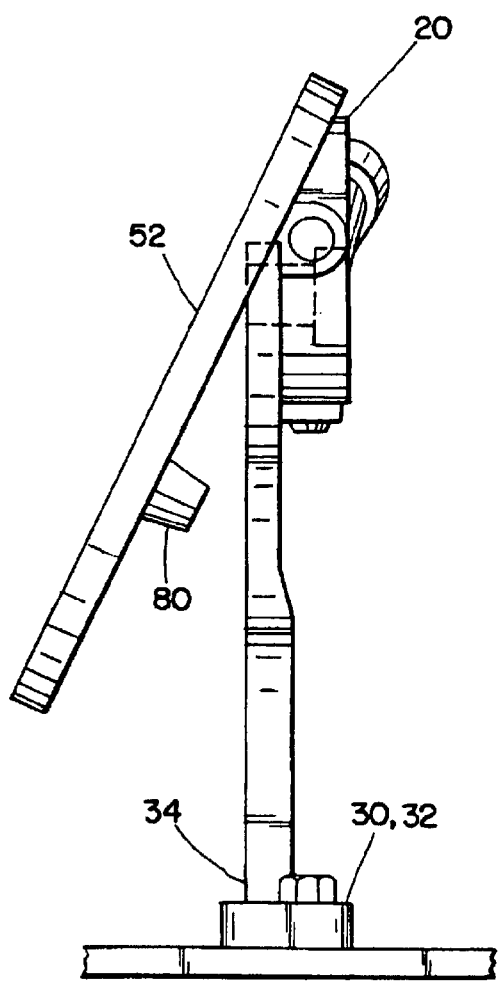
Figure 7:
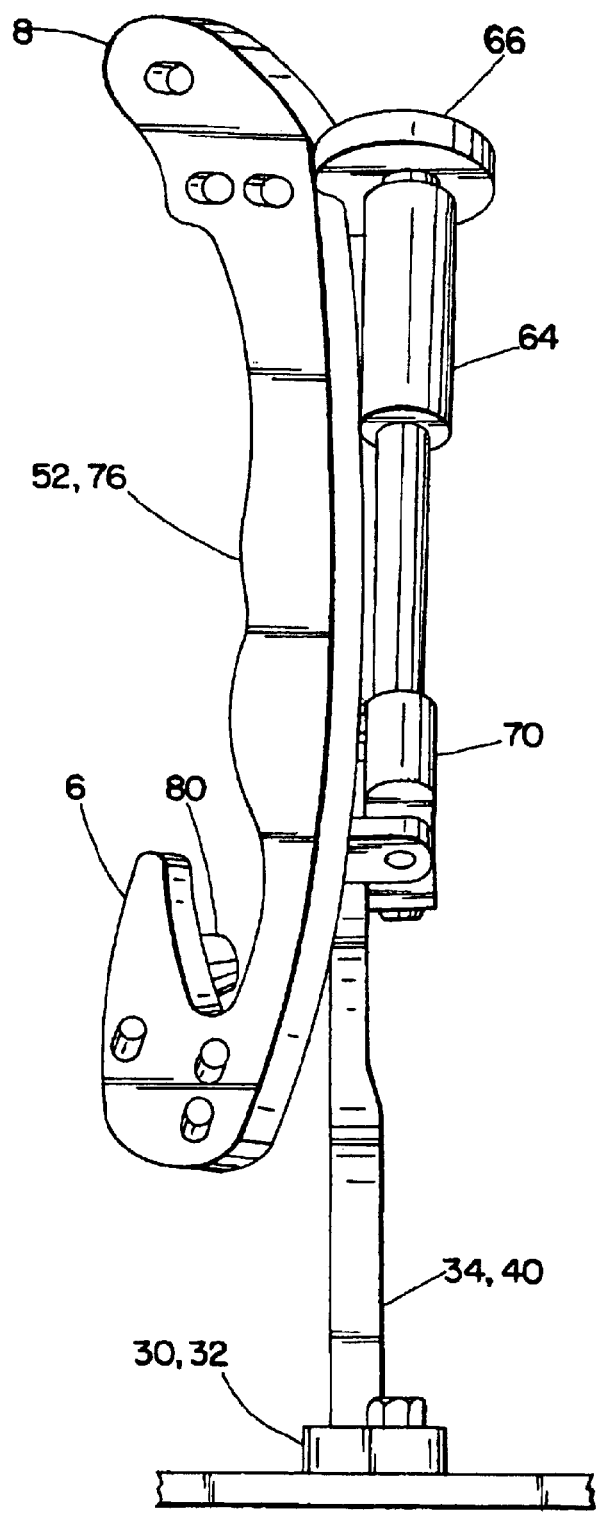
Figure 11:
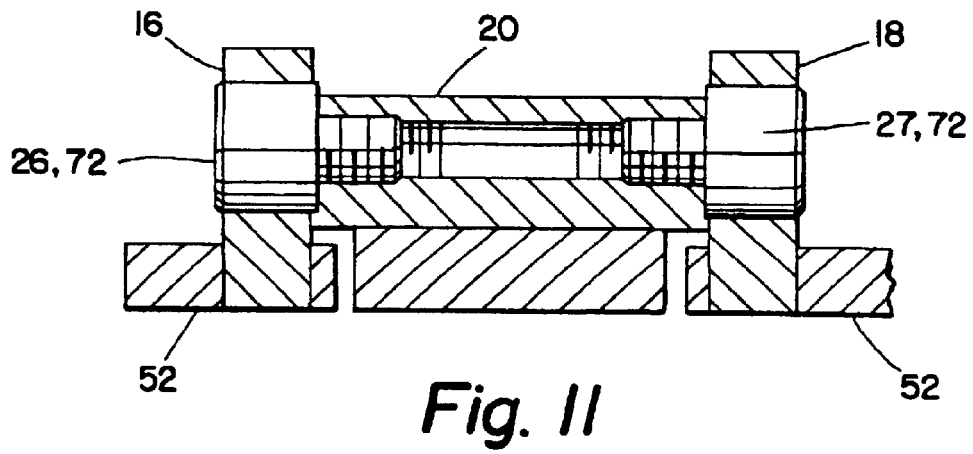
Figure 12:
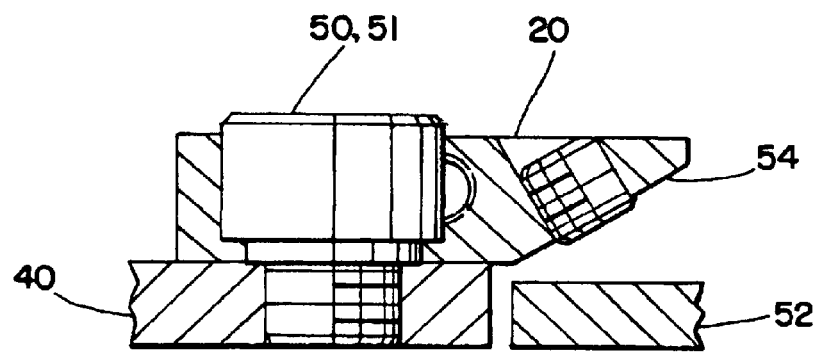
Figure 13:
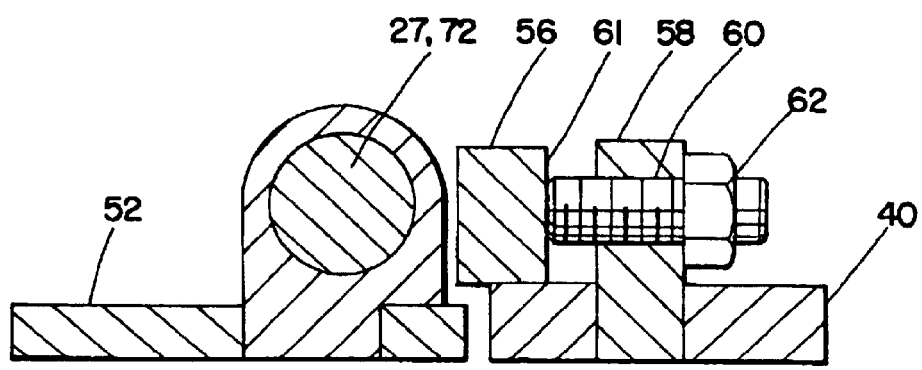

FIG. three shows the two way hinge in a closed position.

FIG. four shows the two way hinge in an open position.

FIG. five shows the two way hinge in edge view closed.

FIG. six shows the two way hinge in edge view open.

FIG. seven shows the two way hinge in top view open.

FIG. eight shows a cross section view of a piston assembly.

FIG. nine shows a cross section view of an upper attach point of the piston assembly.

FIG. ten shows a cross section view of a lower attach point of the piston assembly.

FIG. eleven shows a cross section view of the pivot axis of the hinge assembly.

FIG. twelve shows a cross section view of the rotating axis of the hinge assembly.

FIG. thirteen shows a cross section view of the sag adjuster.

FIG. fourteen shows an exploded view of the pivot plate and associated components.

FIG. fifteen shows the fender guard.

DETAILED DESCRIPTION

With respect to figures one through fifteen, what is herein disclosed and described is a vehicle door hinge assembly (2). The vehicle door hinge assembly (2) has a fender mount (4) the fender mount (4) being generally goose neck shaped and having a convex portion (74) and a concave portion (76). The fender mount (4) has a first hole positioning plate (6) and a second hole positioning plate (8) defined thereon. The first and second hole positioning plates (6, 8) are positionally opposed to each other and allow for easy positioning to a chassis of a motor vehicle. The first hole positioning plate (6) and the second hole positioning plate (8) compnsing a fender mount assembly (52). The first hole positioning plate (6) has a first series of through holes (10) defined therein. The second hole positioning plate (8) has a second series of through holes (12) defined therein. The first and second series of through holes (10, 12) are positioned to use the existing holes located in the particular motor vehicle's fender. The existing holes that the fender mount assembly (52) use are those that the particular motor vehicle use to attach the factory hinge.

A first boss (14) and a second boss (16) are located towards an upper portion (18) of the first fender mount (4), and are spaced in a parallel relationship to allow a pivot plate (20) to be spaced therebetween. The first boss (14) has a first hole (22) defined therein, and the second boss (16) has a second hole (24) defined therein. The first hole (22) and the second hole (24) of the first and second boss (14, 16) respectfully, are axially aligned, allowing for a first and second threaded pin (26, 27) to be inserted therethrough. The first threaded pin (26) and second threaded pin (27) each have bearings (72) located thereon to allow effortless rotation of the pivot plate (20). The bearings (72) on the first and second threaded pins (26, 27) are installed in the first hole (22) of the first boss (14), and the second hole (24) of the second boss (16) respectfully. The pivot plate (20) has a third through hole (28) defined therein. The third through hole (28) is located in a transverse direction (44) on the pivot plate (20).

A first door plate (30) and a second door plate (32) are positionally located by a door bracket (34) the first door plate (30) and the second door plate (32) being fixedly attached to the door bracket (34) to fix the first and second door plates (30, 32) for their intended use. The first door plate (30) has a third series of holes (36) defined therein, and the second door plate (32) has a fourth series of holes (38) defined therein. The third and fourth series of holes (36, 38) are defined by the particular vehicle's "OEM" hinge location. The first door plate (30) the second door plate (32), and the door bracket (34) comprise the door mount assembly (40). The door bracket (34) being shaped to fit within the concave portion (76) of the fender mount assembly (52). The door mount assembly (40) is fixedly attached to a door hinge bracket (42). The door hinge bracket (42) is essentially an "L" shaped member that extends to the upper portion (18) of the first fender mount (4). A fender guard (80) is threadably attached to the fender mount assembly (52) in close proximity to the door bracket (34) to prevent damage to a motor vehicle fender when the vehicle door has not been opened the necessary 20° (degrees) in the horizontal plane.

The pivot plate (20) has a counterbore (46) defined therein, the counterbore being axially aligned to the third hole (28) defining a stepped hole (47) thereby. The stepped hole (47) is located in a short transverse direction (48) on the pivot plate (20). The stepped hole (47) in the pivot plate (20) allows a third threaded pivot pin (50) to be inserted therethrough, and threadably engage the door mount assembly (40) in a rotatable motional relationship with the door mounting assembly (40). The third threaded pivot pin (50) has a third bearing (51) attached thereon, where the third bearing is positioned in the counterbore (46) of the stepped hole (47). The pivot plate (20) now is rotatably positioned about the third threaded pivot pin (50).

The pivot plate (20) has a beveled portion (54) defined thereon. The beveled portion (54) of the pivot plate (20) faces the fender mount assembly (54) and prevents rotation of the door mounting assembly (40) greater than a predefined bevel angle, here defined as 20° (degrees). A third boss or sag plate (56) is attached to the pivot plate (20). A sag adjuster boss (58) is attached to the door mount assembly (40). The sag adjuster boss (58) has a threaded hole (60) defined therein. The sag plate (56) has a face (61), where the face (61) allows a sag adjusting means (62) to bear against it. The sag adjusting means (62) threadably inserted through the sag adjuster boss (58).

A piston assembly (64) is medially attached to the fender mount assembly (52) and also attached to the door mount assembly (40). A piston mounting plate (66) is attached to the fender mount assembly (52). The piston mounting plate (66) has a hole (67) defined therein wherein the hole (67) has a spherical bearing (68) fixedly attached therein. The spherical bearing (68) is a standard known in the industry. The piston assembly (64) is inserted through spherical bearing (68) and fixedly attached thereon, allowing the piston assembly (64) to freely rotate within the confines of the spherical bearing (68). An opposing end (70) of the piston assembly (64) is mechanically attached to the door mounting assembly (40). A piston attach bracket (82) has a threaded hole (94) defined therein. An opposing end (70) of the piston assembly (64) is threadably inserted into the threaded hole (94) of the piston attach bracket (82). The piston attach bracket is generally an "L" shaped component. A washer (96) bears against the piston attach bracket (82) and the piston assembly (64). The piston attach bracket (82) is mounted medially between the lugs of a piston attach clevis (84). An industry standard bolt (86) is pivotably inserted through the piston attach bracket (82) and the lugs of the piston attach clevis (84) and threadably engaged into i the fender mount assembly (52). An securing screw (92) is inserted through the fender mount assembly (52) and is threadably inserted into the piston attach clevis (84) securing the piston attach clevis (84) to the fender mount assembly (52). using a nut and bolt means common in the industry.

The door is opened in the following manner. The user unlocks the door and rotates the door in a horizontal plane approximately 20°, the horizontal plane being defined by the axially aligned holes (22, 24) in the first and second bosses (14, 16). The user can then rotate the door upwards, the roatating axis being defined by the third threaded pivot pin (50). The maximum rotational displacement being 45°. The piston assembly (64) providing assistance to the user in providing a force to keep the door of the motor vehicle open.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A two way hinge for motor vehicle doors, comprising:
   a. a fender mount, said fender mount being generally goose neck shaped and having a convex portion and a concave portion, said fender mount further having a first hole positioning plate and a second hole positioning plate, said first hole positioning plate and said second hole positioning plate being positionally opposed to each other, said first hole positioning plate having a first series of holes defined therein, said second hole positioning plate having a second series of holes defined therein, said first and second series of holes being positionally located to correspond to the particular vehicle being installed therein, said fender mount, said first hole positioning plate, and said second hole positioning plate comprising a fender mount assembly;
   b. a first boss and a second boss being aligned in a parallel relationship and being positioned on an upper portion of said fender mount assembly, said first boss having a first hole defined therein, said second boss having a second hole defined therein, said first and said second hole being axially aligned, a pivot plate, said pivot plate being positioned between said first and said second boss;
   c. a first threaded pin, said first threaded pin being inserted through said first hole in said first boss and being threadably engaged in said pivot plate, a second threaded pin, said second threaded pin being inserted through said second hole in said second boss and being threadably engaged in said pivot plate, said first and said second threaded pin allowing said pivot plate to pivot about axially aligned holes, said pivot plate having a third through hole defined therein, said third through hole having a counterbore defined therein, said counter bore being located on a short transverse position of said pivot plate;
   d. a first door plate and a second door plate are positionally located by a door bracket, said first door plate and said second door plate being fixedly attached to said door bracket, said first door plate, said second door plate and said door bracket comprise a door mount assembly, said door mount assembly being shaped to fit within said concave portion of said fender mount assembly, said door hinge bracket being essentially an L shaped bracket, said door hinge bracket mounting to a motor vehicle door frame;
   e. a fender guard, said fender guard being located in proximity to said first hole positioning plate, said fender guard preventing a motor vehicle door from damaging the sheet metal of a motor vehicle;
   f. a third pivot pin, said third pivot pin being inserted into said counterbored hole in said pivot plate, said third pivot pin being attached to said door mount assembly and allowing said pivot plate to rotate about said third pivot pin;
   g. said pivot plate having a beveled portion defined thereon, said beveled portion defining the horizontal rotational angle of the two way hinge;
   h. a sag adjuster means, said sag adjuster means allowing the vehicle door to be positionally aligned in the motor vehicle thereby; and
   i. a piston mounting plate, said piston mounting plate being attached to said fender mount assembly, said piston mounting plate having a hole defined therein, a spherical bearing is fixedly attached therein, a piston assembly is inserted through said spherical bearing and fixedly attached thereon, an opposing end of said piston assembly is rotatably attached to said door mounting assembly.

2. The two way hinge for motor vehicle doors of claim one wherein said first and said second threaded pins each have a bearing attached thereon, said bearings being inserted through said first and said second holes of said first and said second bosses respectfully.

3. The two way hinge for motor vehicle doors of claim one wherein said third pin is threadably engaged into said door mount assembly.

4. The two way hinge for motor vehicle doors of claim one wherein said third threaded pin has a bearing attached thereon, said bearing being inserted into said counterbore portion of said counterbored hole of said pivot plate.

5. The two way hinge for motor vehicle doors of claim one wherein said sag adjuster means comprises a sag adjuster plate, said sag adjuster plate being attached to said pivot plate, a sag adjuster boss, said sag adjuster boss being attached to said door mount assembly, said sag adjuster boss having a threaded hole defined therein, said sag adjuster means is threadably inserted through said threaded hole in said sag adjuster boss and allows the sag adjuster means to bear on a face of said sag plate.

6. The two way hinge for motor vehicle doors of claim one, wherein, said two way hinge allowing the motor vehicle door to rotate outwards from the vehicle approximately twenty degrees firstly, clearing said fender guard thereby, then said two way hinge allowing the motor vehicle door to pivot upwards forty five degrees secondly providing easy ingress and egress from the motor vehicle.

* * * * *